July 11, 1939.  J. VLASAK  2,165,771
SHIELDING MEANS FOR REAR VIEW MIRRORS
Filed March 31, 1938
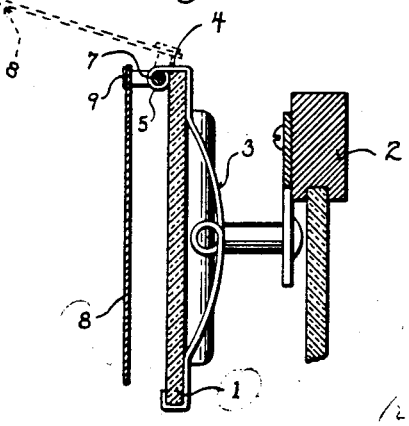
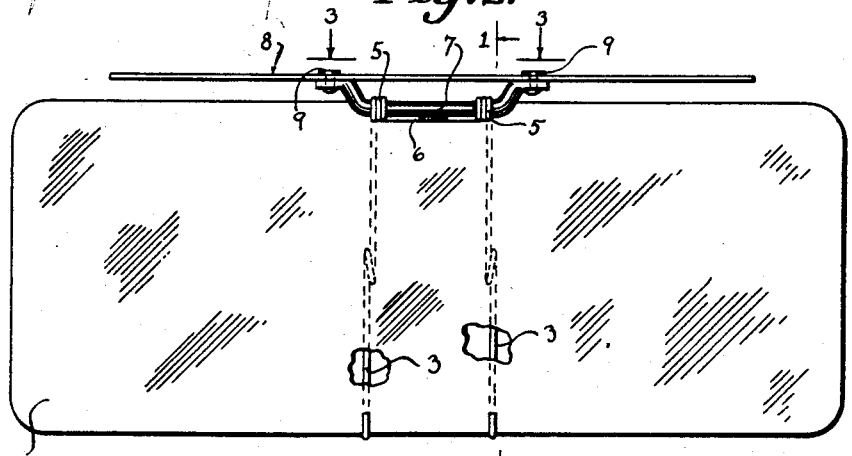
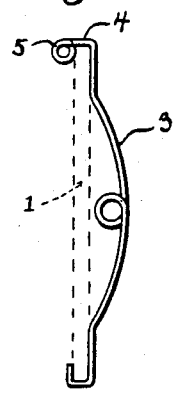
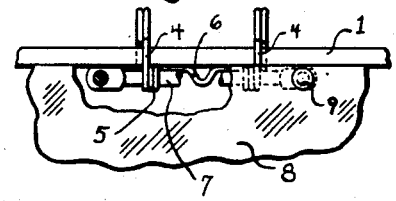
Inventor.
Joseph Vlasak
By
Attorneys.

Patented July 11, 1939

2,165,771

UNITED STATES PATENT OFFICE 2,165,771

SHIELDING MEANS FOR REAR VIEW MIRRORS

Joseph Vlasak, Racine, Wis.

Application March 31, 1938, Serial No. 199,113

1 Claim. (Cl. 88—77)

My invention refers to means for shielding mirrors, and particularly rear view mirrors used in connection with motor vehicles.

The object of my invention is to provide a simple, economical, and effective means for attaching a shield plate to any standard mirror, whereby the shield plate, which is of dull, transparent substance, may be manually folded over the mirror to protect the glare of headlights reflected in the mirror or the shield plate. Attaching means also includes structure whereby the plate, when raised forwardly to expose the mirror, will maintain its raised position, irrespective of vibration of the vehicle. Briefly, the opaque or dull, transparent plate can be manually shifted to a working position, and may be held therein, or raised to expose the mirror when not in use, in which raised position said plate will be firmly maintained.

With the above and other minor objects in view, the invention consists in certain peculiarities of construction and combination of parts thereof, as hereinafter described and subsequently claimed.

In the drawing:

Figure 1 represents a sectional side elevation of a mirror fitted with a shield embodying the features of my invention, the section being indicated by line 1—1 of Figure 2.

Figure 2 is a face view of a standard mirror equipped with a shield in accordance with my invention, the shield being shown in its raised position whereby the mirror is exposed.

Figure 3 is a fragmentary plan view of a portion of the mirror and shield, particularly illustrating the spring gripping means for holding the shield in position.

Figure 4 is a detail elevation of one of the spring clips, showing the mirror in dotted lines fitted therein.

Referring by numerals to the drawing, 1 indicates a standard rear view mirror attached to a portion of the vehicle frame 2, which features form no part of my present invention. Fitted to the back of the mirror is a spring clip embodying legs 3—3 terminating with folded ends for gripping the lower edge of the mirror. The upper ends of the legs are bent to form offset shoulders 4, the same terminating in alined coils 5—5, spaced apart and connected by a bridge-piece 6, the spring clip, as shown, being formed in one piece.

The coils 5 form friction bearings for a pintle rod 7, which has offset arms at its end terminating with feet for engagement with a mirror shield-plate 8, which plate is secured to the feet by rivets 9. The said plate is formed from any suitable dull, transparent material, colored or otherwise, of Cellophane or the like substance. The shield-plate 8 thus equipped with gripping mechanism can be sold in open market, and may be fitted to any standard mirror of usual proportions, it being understood that the mirror may have curved edges, or straight edges as shown in the drawing. It will be noted that the offset arms of the pintle rod serve as shoulders to prevent end play of the plate due to the fact that the spaced coils of the one-piece clip engage the pintle at the junction of its offset ends.

From the foregoing description it will be readily understood that when it is desired to affix the shield to the face of a mirror, the legs of the spring clip are adjusted to the rear face of said mirror, and the lower folded ends are hooked over the bottom edge of the mirror, while the offset shank portions of the legs engage the upper edge of the aforesaid mirror. This upper edge is held firmly between the leg proper and the coils, which constitute bearings for the pintle rod. Hence, when so fitted to the mirror, when it is desired to shield the same from reflected lights, the plate is swung upon its pintle to the position shown in Figure 1 of the drawing, and it can thereafter be manually shifted to the position indicated in dotted lines, whereby the surface of the mirror is exposed, and owing to the frictional engagement of the pintle and spring coils, the mirror, when shifted to its dotted position, will be held in suspension against ordinary movement or vibration of the vehicle.

While I have shown and described the shield clip as being preferably made of spring wire, it is understood that flat spring metal may be substituted therefor.

While I have described various details in construction in carrying out my invention, it is understood that I may vary such structural details within the scope of the claim.

I claim:

An attachment for mirrors comprising, a transparent plate, a short pintle rod terminating in offset arms and feet for securement to the plate, a one-piece spring wire clip for attaching the plate to a mirror, the said clip including leg portions folded at their lower ends to form grips, the upper terminals of the legs being bent to form pairs of offset gripping shoulders for engagement with a mirror edge, the said offset shoulders terminating with pairs of spaced coils connected by a straight stretch of the wire to form double pintle loops for encircling said pintle and engaging its offset shoulder portions to prevent relative longitudinal movement between the pintle rod and clip.

JOSEPH VLASAK.